Inventor
Andrew William Rodger

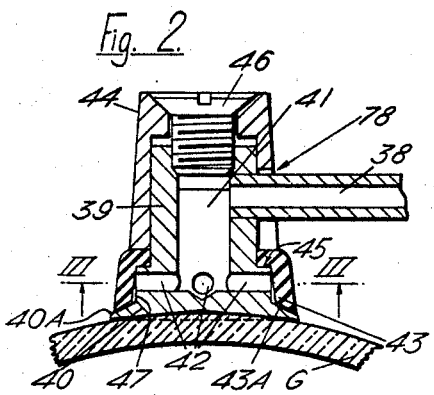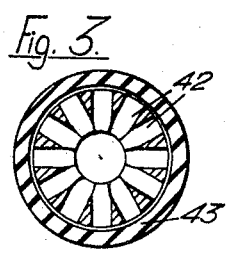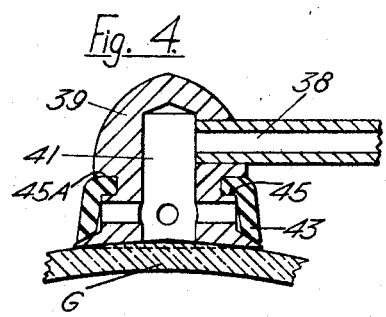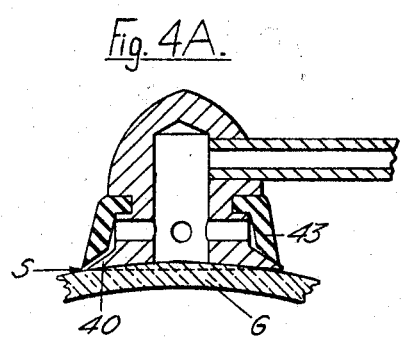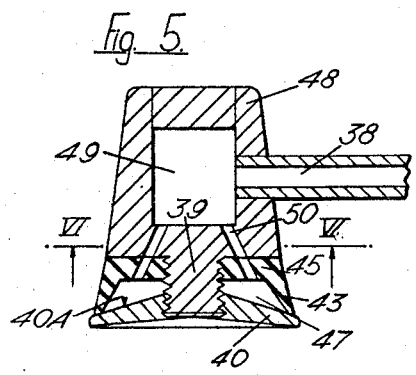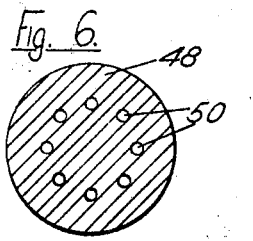

Inventor
Andrew William Rodger
ATTORNEYS.

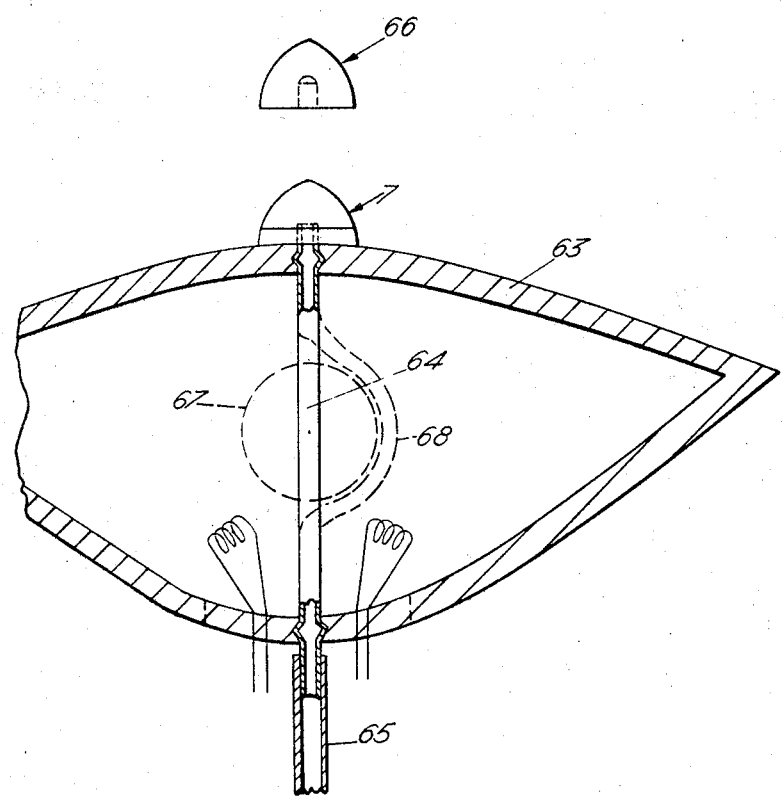

United States Patent Office 3,423,025
Patented Jan. 21, 1969

3,423,025
NOZZLE HAVING A RESILIENTLY YIELDABLE SEALING MEMBER IN COMBINATION WITH A CLEANING SYSTEM FOR VEHICLE GLASS
Andrew William Rodger, 29 Sandown Lodge, Avenue Road, Epsom, Surrey, England
Filed Nov. 23, 1964, Ser. No. 412,913
Claims priority, application Great Britain, Nov. 25, 1963, 46,386/63
U.S. Cl. 239—284    6 Claims
Int. Cl. B05b 1/10

ABSTRACT OF THE DISCLOSURE

An apparatus for cleansing glass surfaces on vehicles employing a nozzle with a resiliently-yieldable sealing member to release a jet of pressurized liquid of elongated thin cross-section closely adjacent and at a small angle or substantially parallel to the glass surface so as to produce a wide substantially continuous curtain of liquid which forces its way over said surface and sweeps away dirt.

---

This invention relates to the removal of obscuring dirt and road grime from the lamp glass and/or windscreen glass of a vehicle.

According to the invention a method of removing obscuring dirt, including road grime, from the lamp glass, windscreen glass or other glass of a vehicle comprises directing a thin, wide, solid stream of high-pressure cleansing liquid from a source of cleansing liquid on the vehicle on to the glass surface so that a wide, substantially solid curtain of liquid forces its way over the surface at high speed and sweeps away the dirt.

Further according to the present invention, apparatus for use in removing obscuring dirt, including road grime, from the lamp glass, windscreen glass or other glass of a vehicle comprises a vessel adapted to store cleansing liquid under high pressure on the vehicle, and a nozzle connected to the vessel and adapted to direct a thin, wide solid stream of high-pressure cleansing liquid from the vessel on to the glass surface so that a wide, substantially solid curtain of liquid forces its way over the surface at high speed and sweeps away the dirt.

An embodiment of the invention will now be described by way of example with reference to the accompanying drawings in which:

FIG. 2 is a sectional side view of one form of headlamp nozzle for the apparatus of FIG. 1.

FIG. 3 is a sectional plan view on the line III—III of FIG. 2.

FIG. 4 is a sectional side view of a modification of the nozzle of FIG. 2.

FIG. 4A is a view similar to FIG. 4 but showing the nozzle discharge slot.

FIG. 5 is a sectional side view of another form of headlamp nozzle.

FIG. 6 is a sectional plan view on the line VI—VI of FIG. 5.

FIG. 11 is a sectional side view showing the nozzle of FIG. 4 applied to a sealed beam headlamp.

Figure 1:
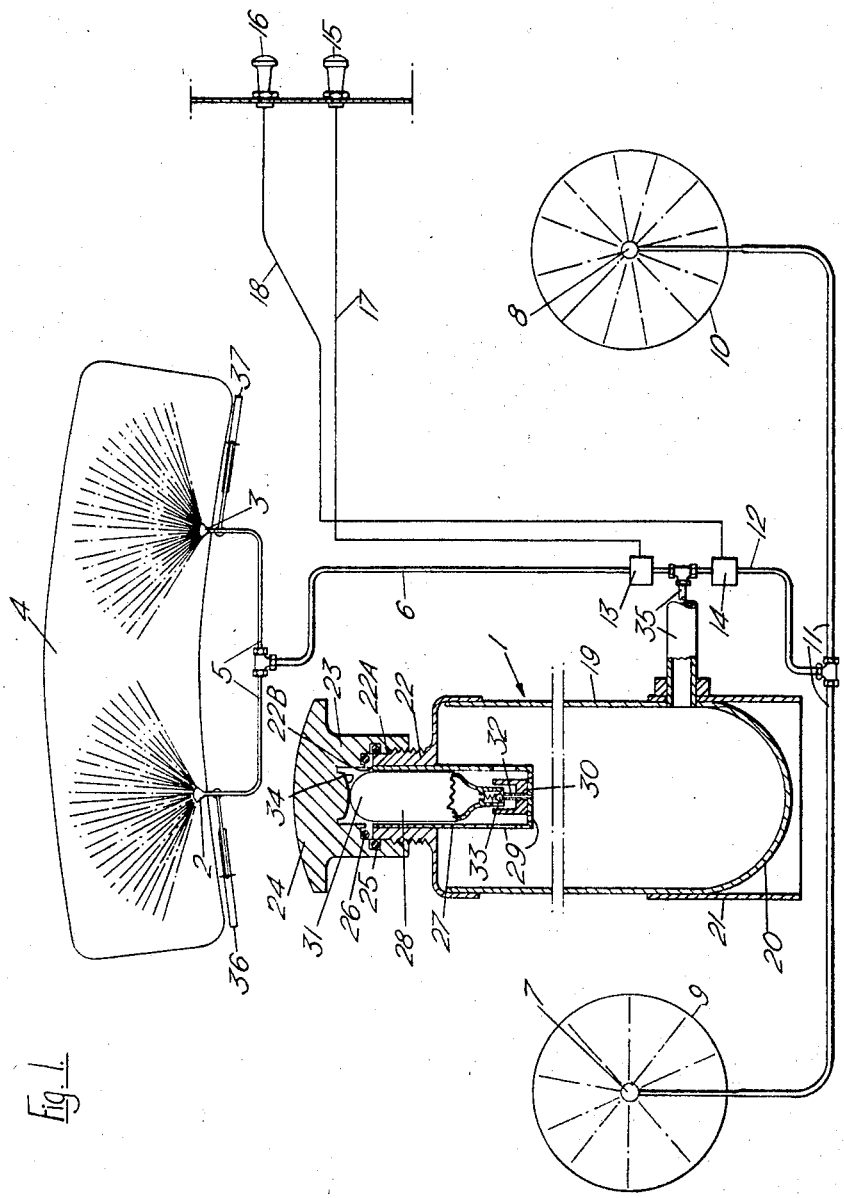
FIG. 1 is a schematic view of apparatus for removing obscuring dirt from the windscreen and lamps of a motor vehicle.

Referring to the drawings:

In a motor vehicle, apparatus for use in washing the exterior surfaces of the windscreen glass and headlamps glass of the vehicle consists of a closed, pressurized vessel 1 containing a liquid mixture of water and chemical cleanser and stowed in a convenient part of the vehicle, a pair of laterally spaced nozzles 2 and 3 at the lower edge of the windscreen 4 and communicating with the vessel through conduits 5 and 6, a pair of nozzles 7 and 8 mounted respectively at the center of the two headlamps 9 and 10 and communicating with the vessel 1 through conduits 11 and 12, a pair of control valves 13 and 14 for controlling the flow of cleansing liquid through the respective conduits 6 and 12, and a pair of valve-actuating pull knobs 15 and 16 on the vehicle's instrument panel and connected to the valves by Bowden-type cables 17 and 18. The vessel 1 consists of an elongated upstanding metal or plastic cylinder 19 with a domed lower end 20 and with a cylindrical skirt 21 enclosing the lower end to form a stand for the vessel. A cylindrical neck 22 at the upper end of the cylinder 19 is externally screw-threaded and carries a correspondingly tapped cylindrical closure 23 fitted with a manual knob 24. A pair of O-rings 25, 26 fitted in grooves in the closure 23 engage respectively a plain upper external peripheral face 22A of the neck and the upper end face 22B of the neck, to seal the vessel. The internal face of the neck has secured thereto an upright cylindrical support 27 for a cylinder 28 of compressed $CO_2$ gas, said support 27 projecting within the vessel 1 and having apertures 29 at its lower end permitting flow of gas from the cylinder 28 into the vessel 1. The lower end of the support 27 carries a central socket 30 which receives the neck of the inverted $CO_2$ cylinder 28 having a domed bottom 31 projecting from the neck of the vessel 1. A piercing tube 32 projects centrally within the socket 30 and extends through the lower end of the support, and a ball valve in the neck of the $CO_2$ cylinder has the ball 33 thereof spring-urged outwards to the closed position and engaged by the end of the piercing tube 32 so that the closed $CO_2$ cylinder 28 is supported on the piercing tube 32. A domed base 34 within the closure 23 engages the domed end 31 of the $CO_2$ cylinder 28 so that on manually screwing down the closure 23 to sealing position against the end 22B of the vessel's neck, the $CO_2$ cylinder 28 is forced towards the piercing tube 32 which opens the ball valve 33 to permit the pressurized $CO_2$ gas to fill the vessel 1 and so pressurize the cleansing liquid in the vessel 1. The lower end of the cylinder 19 carries a lateral outlet conduit 35 for the liquid. The vessel 1 may also include an inlet valve (not shown) adapted to enable alternative pressurizing of the vessel by the compressed air supply at a service station.

The pair of distribution conduits 6 and 12 open from the outlet conduit 35 and extend respectively to the regions of the windscreen and front bumper of the vehicle, and the lateral branch conduits 5 and 11 open from the distribution conduits and deliver to the various nozzles, as described.

The two windscreen nozzles 2 and 3 are located at the pivotal centers of two windscreen wipers 36, 37, being fixed directly on or mounted adjacent to the windscreen, and each nozzle provides a narrow arcuate discharge slot disposed to direct a solid fan-shaped jet in a downward slope towards the outer glass surface so that the nozzles cause solid fan-shaped curtains of cleansing liquid to flow at high speed over the entire semi-circular zones sewpt by the wiper blades. The liquid sweeps away dirt and speeds-up and improves the cleansing action of the wipers.

The nozzle consists of a segmental head with passage means therethrough, and the head at the outlet from its passage means includes an arcuate skirt or rubber or the like in sealing engagement with an arcuate seat, said skirt being deformable to a position clear of the seat by the pressurized liquid to define with the seat the narrow arcuate outlet slot, and returning to sealing position against the seat when the supply of liquid to the head is cut off, thereby protecting the nozzle against the entry of external dirt and foreign matter.

Referring to FIGS. 2 and 3, each circular head-lamp nozzle 7 and 8 (FIG. 1) is served by an exterior supply conduit 38 and consists of a cylindrical stud 39 with an integral annular base flange 40 having a conical face 40A, an axial reservoir bore 41 in the stud, a peripheral series of say twelve equispaced radial passages 42 in the stud opening from the lower end of the reservoir bore and discharging laterally, an angle-section annular skirt 43 of rubber of resilient plastic material co-axially mounted at its outer flanged end on the stud, and a sleeve 44 slidingly engaging the sutd and clamping the flange of the skirt between the sleeve's lower end and an annular step 45 on the stud. A screw 46 engaging in the tapped upper end of the axial bore 41 seals the bore and engages the sleeve end to secure the sleeve 44 in clamping position. The skirt 43 forms a wall of a narrow annular discharge chamber 47 at the outer ends of the radial passages 42 and has a coned lower end 43A sealingly engaging the conical face 40A of the base flange 40. The radial inlet conduit 38 is carried by the stud and discharges into the stud bore 41, and an axial slot in the sleeve permits passage of the radial conduit through the sleeve. The skirt 43 seals the nozzle until the pressurized liquid deforms the skirt to a position clear of the face 40A to form a narrow annular slot which permits issue of a conical curtain of liquid.

In use of the headlamp nozzle, the high-pressure liquid passes through the head to the chamber 47 and there deforms the skirt 43 outwards to a position clear of the flange face 40A so that the skirt defines with the flange a narrow annular outlet slot through which a thin, solid conical jet of liquid issues and impinges on the glass surface at a small angle to the surface. Following impingement, the liquid flows as a high-speed annular curtain radially outwards over the glass surface and sweeps away dirt from the surface. The skirt returns to sealing position against the flange when the flow of liquid to the nozzle is cut off.

By virtue of the reservoir 41, passages 42 and chamber 47, the cleaning liquid remains in the nozzle ready for discharge at all times so that there is no delay when the valve is actuated; moreover freezing of the system is avoided when an anti-freeze substance is added to the cleaning liquid.

In the modified arrangement of FIG. 4, the sleeve and screw are dispensed with and instead the stud bore 41 is blind at its upper end and is closed at its lower end by the lamp glass G, and the flange 45 of the skirt 43 is secured in an annular groove 45A in the stud 39. In this instance the stud 39 is shaped to simulate the usual central cap of the headlamp and so lends itself to attachment to a headlamp in replacement of a dummy removable cap on the headlamp. In FIG. 4A, the skirt 43 is shown resiliently deformed radially outwards by the high-pressure liquid to define with the flange 40 a narrow annular discharge slot S.

In the form of headlamp nozzle shown in FIGS. 5 and 6 and served by an exterior supply conduit 38, a stud has a screw-threaded stem 39, a conical base 40 in screw-threaded engagement with the stem, a head 48 integral with the stem, a reservoir 49 in the head served by the radial liquid supply conduit 38, an angle-section rubber or resilient-plastics skirt 43 with its flange 45 secured to the underface of the head 48 and with its inner edge engaging the conical face 40A of the adjustable base 40, and a peripheral series of say eight axial passages 50 diverging from the reservoir floor to the underface of the skirt flange 45 to discharge into the annular chamber 47 between the skirt 43 and the base 40. By rotating the head 48 the pressure of the skirt 43 on the base 40 is varied in accordance with the thickness of jet desired.

Figure 7:
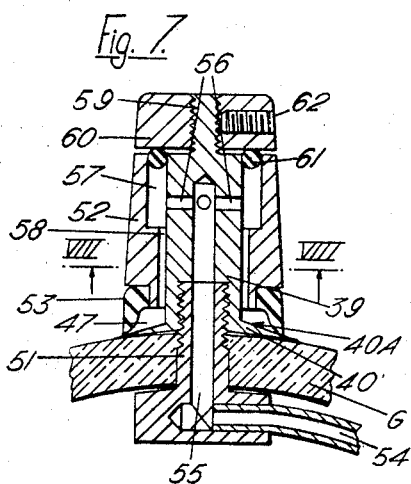
FIG. 7 is a form of headlamp nozzle supplied by an internal radial conduit.
Figure 8:
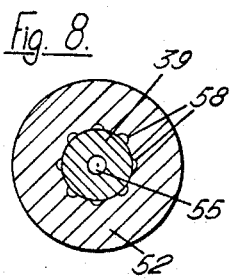
FIG. 8 is a sectional plan view on the line VIII—VIII of FIG. 7.

A form of headlamp nozzle served by an interior supply conduit is shown in FIGS. 7 and 8 and consists of a stud 39 with an integral conical base flange 40 engaging the outer face of the lamp glass G, a screw-threaded plug 51 extending through the lamp glass and engaging in a tapped hole in the bottom of the stud 39 to clamp the stud to the lamp glass, a sleeve 52 slidingly engaging the stud 39 and carrying at its inner end a resiliently deformable skirt 53 which has an inner edge engaging the conical face 40A of the base flange 40, an internal radial conduit 54 delivering liquid to a central axial bore 55 in the plug 51 and stud 39, a peripheral series of radial passages 56 extending from the outer end of the axial bore 55 to an annular reservoir 57 formed by an annular recess in the wall of the sleeve 52, and a peripheral series of axial passages 58 extending from the reservoir 57 to a discharge chamber 47 at the inner end of the sleeve. A threaded integral stem 59 on the outer end of the stud 39 is engaged by a tapped collar 60 which engages a rubber or the like O-ring 61 closing the mouth of the reservoir 57 and resiliently retaining the sleeve 52, the collar 60 being secured in adjusted position slightly clear of the sleeve and by a pinching screw 62. The sleeve 52 with the skirt 53 thereon resiliently yields axially outwards and the skirt resiliently deforms slightly radially outwards, to form the annular discharge slot.

Figure 9:
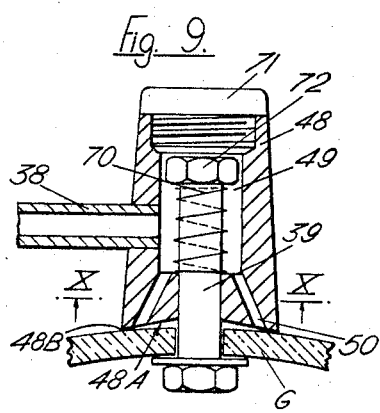
FIG. 9 is a sectional side view of another form of headlamp nozzle.
Figure 10:
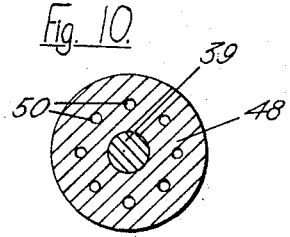
FIG. 10 is a sectional plan view on the line X—X of FIG. 9.

FIGS. 9 and 10 show a modification of the nozzle of FIG. 5. Thus, the base 40 and skirt 43 are dispensed with, and the stem is in the form of a bolt 39 slidingly carrying the head 48 and projecting into the reservoir 49 in the head. The bolt's inner end projects through and is secured to the glass G, and its outer end in the reservoir 49 carries a compression spring 70 which urges the head 48 towards the exterior face of the glass G. The inner end face 48A of the head 48 is conically recessed and the outer rim 48B of the recess 48A yieldingly engages the face of the glass so that liquid delivered to the recess 48A through the diverging axial passages 50 forces the head 48 clear of the glass face and flows as an annular stream through the narrow annular slot formed between the rim 48B and the glass face. The outer end of the reservoir is closed by a screw-threaded cap 71 which is removed to enable adjustment of the nut 72 retaining the spring 70 on the bolt 39. Thus the pressure of the head 48 on the glass face is adjustable.

Referring to FIG. 11, liquid is supplied to the nozzle 7 on a sealed beam headlamp 63 by an axial tube 64, say of steel, built into and sealed in the headlamp with the tube ends projecting. The nozzle 7 is connected to the tube's outer end, and a supply conduit 65, say of plastics material, is connected to the tube's inner end. Conveniently, the tube's outer end may be screw threaded and closed by a screw threaded dummy cap 66 which is readily replaced by a screw threaded nozzle 7 when the washing apparatus is being fitted on the vehicle. In an unsealed headlamp, the lamp proper 67 is disposed in the middle of the casing, and the tube 64 is cranked as at 68 to clear the lamp.

Due to the build-up of film of road grime, insects, dust, mud and other dirt on the glass of the head and spot lamps of motor vehicles during travel, the lamps seldom operate at optimum efficiency. For example, a motor car headlamp covered with a light, dried dust film is, at a distance of 30 feet, at best 50% efficient. Again, in overtaking another motor car it frequently happens that the dirt and mud thrown up reduces the efficiency of the lamps to about 25%.

In use of the washing apparatus, the vessel containing the cleansing liquid and a $CO_2$ cylinder is pressurized to a pressure in the approximate range 25–40 lbs./in.$^2$ in the manner described, and thereafter, to clean the surfaces of the lamps, windscreen or other glass during travel of the motor car, the driver simply pulls one or other of the knobs on the instrument panel to force thin curtains of cleansing liquid over the surfaces and immediately restore their clarity and efficiency.

The mechanical valves may be replaced by electrical valves operable by switches on the instrument panel.

The nozzles may be applied to a rear window or other glass of the vehicle, and may be semi-circular or less (arcuate), that is to say, in the approximate range of 100 to 180°; while the nozzles of the head or other lamp may be circular, oval, rectangular, or any convenient form, depending on the shape and dimensions of the glass surface to be cleaned; in either or both instances, each nozzle may be composed of one or more parts, and the peripheral slot may discharge either a flat or a coned stream, the criterion being that the slot so directs a wide, thin solid, high-pressure stream as to cause a thin substantially solid curtain of liquid to force its way at high speed over the entire area to be cleaned.

The headlamp nozzles may be incorporated into the center of the lamp lens during manufacture, as inserts of either metal or plastic. Also, the radial conduit tube may be formed in the lamp lens as a tubular cavity extending from the center to the perimeter and terminating at the perimeter in a suitable connector.

The invention may be applied to spot and fog lamps, rear lights, reversing lamps and reflectors, and also to single, twin or multi-headlamp arrangements.

An example of suitable dimensions for a substantially cylindrical headlamp nozzle to be mounted centrally on the glass exterior e.g. by means of a suitable cement, is:

Diameter: 0.6–0.7 inch.
Length: 0.8–1.2 inches.

I claim:
1. Apparatus for use in removing obscuring dirt from a glass surface of a vehicle, which apparatus comprises a source of pressurized liquid and a nozzle connected to said source and disposed closely adjacent to said glass surface, said nozzle including a resiliently yieldable sealing member engageable with an opposed surface to seal the nozzle and prevent passage of unpressurized liquid therefrom and displacable by pressurized liquid in the nozzle away from said opposed surface to open a narrow elongated liquid outlet slot parallel and closely adjacent to the glass surface, whereby the slot directs a wide substantially continuous curtain of liquid over the glass surface, which curtain forces its way over the glass surface and sweeps away dirt.

2. In combination, a glass for a vehicle and a cleaning nozzle associated with said glass, which nozzle includes a resiliently-yieldable sealing member engageable with an opposed surface to seal the nozzle and prevent passage of unpressurized liquid therefrom and displaceable by pressurized liquid in the nozzle away from said opposed surface to open a narrow elongated liquid outlet slot parallel and closely adjacent to the glass surface, whereby the slot directs a wide substantially continuous curtain of liquid over the glass surface, which curtain forces its way over the glass surface and sweeps away dirt.

3. The combination according to claim 2 wherein said sealing member comprises a skirt of elastomeric material.

4. The combination according to claim 2 wherein said sealing member engages the glass surface.

5. The combination according to claim 2 wherein said sealing member engages a seat carried by the glass surface.

6. The combination according to claim 2, wherein the glass is a head light glass.

References Cited

UNITED STATES PATENTS

| | | | |
|---|---|---|---|
| 2,306,778 | 12/1942 | Carney | 15—250.01 |
| 2,373,555 | 4/1945 | Folke | 239—534 |
| 3,058,142 | 10/1962 | Pollock | 15—250.02 |
| 3,089,204 | 5/1963 | Fingeroot et al. | 15—250.01 |
| 3,107,383 | 10/1963 | Carpenter et al. | 15—250.02 |
| 3,117,727 | 1/1964 | Pollock et al. | 15—250.01 XR |
| 3,127,116 | 3/1964 | Pollock et al. | 239—284 XR |
| 3,197,144 | 7/1965 | Kochner | 239—308 |
| 3,199,787 | 8/1965 | Oishei et al. | 239—534 XR |
| 3,295,004 | 12/1966 | Hirsch. | |

MORRIS O. WOLK, *Primary Examiner.*

BARRY S. RICHMAN, *Assistant Examiner.*

U.S. Cl. X.R.

15—250.01; 134—6, 34, 42; 239—534; 240—7.1